United States Patent
Flemming et al.

(10) Patent No.: US 8,361,333 B2
(45) Date of Patent: *Jan. 29, 2013

(54) COMPOSITIONS AND METHODS TO FABRICATE A PHOTOACTIVE SUBSTRATE SUITABLE FOR SHAPED GLASS STRUCTURES

(75) Inventors: Jeb H. Flemming, Albuqerque, NM (US); Colin T. Buckley, Albuquerque, NM (US); Carrie Schmidt, Las Lunas, NM (US)

(73) Assignee: Life Bioscience, Inc., Albuquerque, NM (US)

( * ) Notice: Subject to any disclaimer, the term of this patent is extended or adjusted under 35 U.S.C. 154(b) by 661 days.

This patent is subject to a terminal disclaimer.

(21) Appl. No.: 12/058,588

(22) Filed: Mar. 28, 2008

(65) Prior Publication Data
US 2008/0248250 A1   Oct. 9, 2008

Related U.S. Application Data

(60) Provisional application No. 60/908,631, filed on Mar. 28, 2007, provisional application No. 60/910,257, filed on Apr. 5, 2007.

(51) Int. Cl.
*B44C 1/22* (2006.01)
*C03B 32/02* (2006.01)
(52) U.S. Cl. ........ 216/31; 216/52; 216/53; 216/55; 216/83; 216/87; 216/97; 65/33.2; 65/31
(58) Field of Classification Search .............. None
See application file for complete search history.

(56) References Cited

U.S. PATENT DOCUMENTS

| | | | |
|---|---|---|---|
| 2,515,941 A * | 7/1950 | Stookey | 430/13 |
| 2,628,160 A * | 2/1953 | Stookey | 216/87 |
| 2,684,911 A | 7/1954 | Stookey | |
| 2,971,853 A * | 2/1961 | Stookey | 501/4 |
| 5,078,771 A | 1/1992 | Wu | |
| 5,212,120 A * | 5/1993 | Araujo et al. | 501/13 |
| 7,132,054 B1 | 11/2006 | Kravitz et al. | |
| 2002/0123007 A1 | 9/2002 | Bellman et al. | |
| 2002/0139769 A1* | 10/2002 | Helvajian et al. | 216/18 |
| 2003/0025227 A1* | 2/2003 | Daniell | 264/2.5 |
| 2004/0137372 A1 | 7/2004 | Livingston et al. | |
| 2004/0198582 A1 | 10/2004 | Borrelli et al. | |
| 2005/0100298 A1 | 5/2005 | Okubora et al. | |
| 2006/0171033 A1* | 8/2006 | Schreder et al. | 359/566 |
| 2008/0245109 A1* | 10/2008 | Flemming et al. | 65/387 |
| 2010/0022416 A1* | 1/2010 | Flemming et al. | 506/39 |
| 2011/0195360 A1* | 8/2011 | Flemming et al. | 430/314 |

FOREIGN PATENT DOCUMENTS

JP   08026767 A  *  1/1996

OTHER PUBLICATIONS

International Search Report and Written Opinion for PCT/US2008/058783 dated Jul. 1, 2008.

* cited by examiner

*Primary Examiner* — Anita Alanko
(74) *Attorney, Agent, or Firm* — Chainey P. Singleton; Chalker Flores, LLP

(57) ABSTRACT

This invention provides an inexpensive and rapid method for fabricating a high-anisotropic-etch ratio, shaped glass structures using a novel photosensitive glass composition. Structures of the photosensitive glass may include micro-channels, micro-optics, microposts, or arrays of hollow micro-needles. Furthermore, such shaped glass structures can be used to form a negative mold for casting the shape in other materials.

15 Claims, 9 Drawing Sheets

COMPOSITIONS AND METHODS TO FABRICATE A PHOTOACTIVE SUBSTRATE SUITABLE FOR SHAPED GLASS STRUCTURES

CROSS-REFERENCE TO RELATED APPLICATIONS

This application claims priority to U.S. Provisional Application Serial No. 60/908,631, filed Mar. 28, 2007, and U.S. Provisional Application Serial No. 60/910,257, filed on Apr. 5, 2007, the contents of which are incorporated by reference herein in its entirety.

FIELD OF THE INVENTION

The present invention relates to a method to fabricate a shaped glass structure with a high-anisotropic-etch ratio and, in particular, a method to fabricate a shaped glass structure with a high-anisotropic-etch ratio using a novel photosensitive glass composition.

BACKGROUND OF THE INVENTION

Photosensitive glass structures have been suggested for a number of micromachining and microfabrication processes such as hollow microneedle arrays being developed for transdermal drug delivery and the withdrawal of body fluids for biomedical and other applications. Unfortunately, silicon microfabrication processes are long, difficult, and expensive. These microfabrication processes rely on expensive capital equipment; X-ray lithography and deep reactive ion etching machines which generally cost in excess of one million dollars each and require an ultra-clean, high-production silicon fabrication facility costing millions more.

Anisotropic-etch ratios for FOTURAN® have generally been reported to be about 20:1 when exposed using high-powered (non-laser based) broad spectrum mid-ultraviolet flood lamp, but one paper notes an increased aspect ratio obtained when the photostructurable glass is patterned with a laser: "Effect of Laser Parameters on the Exposure and Selective Etch Rate in Photostructurable Glass" by Frank E. Livingston, et al., published in the Proceedings of the SPIE Vol 4637, pp. 404-12 notes at the top of page 410 that "In this high power regime, the measured etch rate ratio remained constant at ~30:1." (See also FIG. 7 on the same page 410, labeled "Etch rate ratio versus incident laser power for FOTURAN®"). The prior art glass microfabrication processes have had etch ratios of 30:1 when patterned with a laser and 20:1 when patterned with a flood lamp, resulting in a microstructure with a large wall slopes. Photostructured microneedles and other micromachined structures such as micro-lenses suffer precision due to excessive wall slope.

SUMMARY OF THE INVENTION

The present invention is directed to a method to do glass micromachining with etch ratios of 30:1 or more using a mid-ultraviolet flood exposure system and potentially 40:1 or more (preferably 50:1 or more) using a laser-based exposure system, to produce high-precision structures. Thus, for example, with nearly vertical wall slopes on both the inside and outside diameters of hollow photostructured microneedles only minor wall-thickness variation from tip to base would occur. In addition, microposts, which are non-hollow microneedles, may be micromachined to possess a low wall slope, enabling a decrease in the overall micropost diameter. Likewise, micro-lenses can be shaped with precisely controlled horizontal variations and have only minor vertical variation.

Furthermore, the precision shape of a glass structure with an anisotropic-etch ratio of 40:1 or more can be used to determine the shape of a non-glass material in the negative mold. A mold material can be: (1) deposited onto a shaped glass structure with a high-anisotropic-etch ratio to provide a negative mold; (2) the negative mold removed from the glass device; (3) a non-glass material cast into the negative mold; (4) the material in the negative mold is solidified; (5) the solidified non-glass material removed from the negative mold to provide a precision (e.g. anisotropic-etch ratio of 40:1 to 50:1) casting of a non-glass material. Furthermore, unlike expensive dry-etching processes used in silicon-semiconductor-type processes, this process can produce very high anisotropic-etch ratios with relatively inexpensive wet etching.

The present invention includes a method for fabricating a shaped glass structure with a high-anisotropic-etch ratio, using a photosensitive glass substrate having a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. This varied composition is generally referred to as the APEX. At least one portion of the photosensitive glass substrate is exposed to ultraviolet light, while leaving at least a second portion of said glass substrate unexposed; the glass substrate is heated to a temperature near the glass transformation temperature to transform at least part of the exposed glass to a crystalline material; and the glass substrate is etched in an etchant, wherein the etch ratio of exposed portion to that of the unexposed portion is at least 30:1 when exposed with a broad spectrum mid-ultraviolet flood light, and greater than 30:1 when exposed with a laser, to provide a shaped glass structure with an anisotropic-etch ratio of at least 30:1. Percentages herein are in weight percent of the constituents.

This photosensitive, shaped glass structure with a high-anisotropic-etch ratio, can be composed of: 35-76 weight % silica, 3-16 weight % $K_2O$, 0.003-1 weight % $Ag_2O$, 0.75-13 weight % $B_2O_3$, 8-15 weight % $Li_2O$, and 0.001-0.1 weight % $CeO_2$. This photosensitive glass is processed using at least one of the following steps: At least one portion of the photosensitive glass substrate is exposed to ultraviolet light, while leaving at least a second portion of said glass substrate unexposed; the glass substrate is heated to a temperature near the glass transformation temperature to transform at least part of the exposed glass to a crystalline material; and the glass substrate is etched in an etchant, wherein the etch ratio of exposed portion to that of the unexposed portion is at least 30:1 when exposed with a broad spectrum mid-ultraviolet flood light, and greater than 30:1 when exposed with a laser, to provide a shaped glass structure with an anisotropic-etch ratio of at least 30:1.

This can also be a method to fabricate a shaped glass structure with a high-anisotropic-etch ratio, using a photosensitive glass substrate having a composition of: 46-76 weight % silica, 3-16 weight % $K_2O$, 0.003-1 weight % $Ag_2O$, 0.75-13 weight % $B_2O_3$, 6-7 weight % $Al_2O_3$, 11-15 weight % $Li_2O$, and 0.001-0.1 weight % $CeO_2$. The photosensitive glass is processed using at least one of the following steps: At least one portion of the photosensitive glass substrate is exposed to ultraviolet light, while leaving at least a second portion of said glass substrate unexposed; the glass substrate is heated to a temperature near the glass transformation temperature to transform at least part of the exposed glass to a crystalline material; and the glass substrate is etched in an etchant, wherein the etch ratio of exposed portion to that of the unexposed portion is at least 30:1 when exposed with a broad spectrum mid-ultraviolet flood light, and greater than 30:1 when exposed with a laser, to provide a shaped glass structure with an anisotropic-etch ratio of at least 30:1. Our analysis indicates that the formation of smaller crystalline $LiAlSi_2O_6$ during the processing may be an important factor in the observed sensitivity to ultraviolet light exposure and etch rate.

All embodiments are essentially germanium-free. In some embodiments, $Sb_2O_3$ or $As_2O_3$ is added (e.g. at least 0.3 weight % $Sb_2O_3$ or $As_2O_3$) to help control the oxidation state of the composition. In some preferred embodiments, at least 0.75 weight % $B_2O_3$ is included, and in others at least 1.25 weight % $B_2O_3$ is included. In some preferred embodiments, at least 0.003% $Au_2O$ is included in addition to at least 0.003 weight % $Ag_2O$. In some embodiments, a combination of CaO and/or ZnO is added up to 18 weight %. In some embodiments, up to 10 weight % MgO is added. In some embodiments, up to 18 weight % lead oxide is added. Up to 5 weight %, $Fe_2O_3$, may be added to make the material paramagnetic and iron (II) and iron (III) may be added as a quenching agent to reduce autofluorescence of the glass.

Preferably, the glass substrate is heated to a temperature of 420-520 C for between 10 minutes and 2 hours and then heated to a temperature range heated to 520-620 C for between 10 minutes and 2 hours.

In some embodiments, the etchant is HF, in some embodiments the etchant is a combination of HF and additional ingredients, such as hydrochloric acid or nitric acid. The preferred wavelength of the ultraviolet light used for exposure is approximately 308-312 nm.

In one embodiment, the present invention is a shaped glass structure with a high anisotropic-etch ratio having a photosensitive glass substrate with a glass transformation temperature. The photosensitive glass substrate may have one or more patterned structure and a glass composition of about 60-76 weight % silica, 6 weight %-16 weight % of a combination of $K_2O$ and $Na_2O$ with at least 3 weight % $K_2O$, 0.001-1 weight % $Ag_2O$, 0.75 weight %-7 weight % $B_2O_3$, and 5-8 weight % $Al_2O_3$, with the combination of $B_2O_3$, and $Al_2O_3$ not exceeding 13 weight %, 8-15 weight % $Li_2O$, and 0.04-0.1 weight % $CeO_2$.

The patterned structure may have at least one portion exposed to an activating energy source such as ultraviolet light and at least a second portion of the glass substrate not exposed to the ultraviolet light. Part of this exposed portion may be transformed into a crystalline material by heating the glass substrate to a temperature near the glass transformation temperature. When etching the glass substrate in an etchant such as hydrofluoric acid, the anisotropic-etch ratio of the exposed portion to the unexposed portion is at least 30:1 when the glass is exposed to a broad spectrum mid-ultraviolet (about 308-312 nm) flood lamp to provide a shaped glass structure with an aspect ratio of at least 30:1, and to provide shaped glass structures with an aspect ratio much greater than 30:1 when the glass is exposed using a high powered energy source, such as a laser.

Preferably, the shaped glass structure contains at least one of, a micro-optic lens, a micro-optic micro-post, a micro-channel, or micro-ridge micro-optic waveguide. The micro-ridge, optical waveguide may be formed by etching away exposed glass to leave a glass micro-ridge such that light is guided by the micro-ridge. The micro-ridge may be formed using a layer of photosensitive glass overlying a layer of non-photosensitive glass of lower index of refraction than the photosensitive glass, to substantially prevent micro-ridge-guided light from leaving the bottom of the micro-ridge in at least one portion of the micro-ridge (e.g. bottom vias may be etched in the non-photosensitive glass to allow light coupling to a light guide on a lower level).

In this embodiment, the composition of the shaped glass structure may essentially be germanium-free, contain at least 0.5 weight % $B_2O_3$ or contain at least 1.25 weight % $B_2O_3$, contain at least 0.3 weight % $Sb_2O_3$ or $As_2O_3$, contain 0.003-1 weight % of at least one of $Au_2O$ and $Ag_2O$, contains 1-18 weight % of an oxide such as of CaO, ZnO, PbO, MgO and BaO, contain 0-5 weight %, iron ($Fe_2O_3$) to make the composition paramagnetic and/or to use iron (II) and iron (III) to quench intrinsic autofluorescence, and contain up to 2 weight % Copper Oxide. The shaped glass structure may also have an anisotropic-etch ratio of about 30-45:1.

In another embodiment, the present invention is a shaped glass structure with a high anisotropic-etch ratio having a photosensitive glass substrate with a glass transformation temperature. The photosensitive glass substrate may have one or more patterned structure, and a glass composition of about 35-76 weight % silica, 3-16 weight % $K_2O$, 0.001-1 weight % of at least one oxide such as $Ag_2O$ and $Au_2O$, 0.75-13 weight % $B_2O_3$, 8-15 weight % $Li_2O$, and 0.0014-0.1 weight % $CeO_2$.

In this embodiment, the patterned structure may have at least one portion exposed to an activating energy source such as ultraviolet light and at least a second portion of the glass substrate not exposed to the ultraviolet light. Part of this exposed portion may be transformed into a crystalline material by heating the glass substrate to a temperature near the glass transformation temperature. When etching the glass substrate in an etchant such as hydrofluoric acid, the anisotropic-etch ratio of the exposed portion to the unexposed portion is at least 30:1 when the glass is exposed to a broad spectrum mid-ultraviolet (about 308-312 nm) flood lamp to provide a shaped glass structure with an aspect ratio of at least 30:1, and to provide shaped glass structures with an aspect ratio much greater than 30:1 when the glass is exposed using a high powered energy source, such as a laser. In addition, the composition of the shaped glass structure may essentially be germanium-free, contain at least 0.5 weight % $B_2O_3$ or at least 1.25 weight % $B_2O_3$.

In another embodiment, the present invention is a shaped glass structure with a high anisotropic-etch ratio having a photosensitive glass substrate with a glass transformation temperature. The photosensitive glass substrate may have one or more patterned structure, and a glass composition of about 46-76 weight % silica, 3-16 weight % $K_2O$, 0.001-1 weight % $Ag_2O$, 0.5-13 weight % $B_2O_3$, 8-15 weight % $Li_2O$, and 0.001-0.1% $CeO_2$. For example, the photosensitive glass substrate may have one or more patterned structure, and a glass composition of about 45, 50, 55, 60, 70, 75 or 76 weight % silica; 3, 5, 7, 8, 10, 12 or 16 weight % $K_2O$; 0.001, 0.01, 0.1, 0.25, 0.5, 0.75 or 1 weight % $Ag_2O$; 0.5, 1, 2.5, 5, 7.5, 10, 12.5 or 13 weight % $B_2O_3$; 8, 7, 9, 10, 12.5 or 15 weight % $Li_2O$; and 0.001, 0.01, 0.05 or 0.1% $CeO_2$.

In this embodiment, the patterned structure may have at least one portion exposed to an activating energy source such as ultraviolet light and at least a second portion of the glass substrate not exposed to the ultraviolet light. Part of this exposed portion may be transformed into a crystalline material by heating the glass substrate to a temperature near the glass transformation temperature. When etching the glass substrate in an etchant such as hydrofluoric acid, the anisotropic-etch ratio of the exposed portion to the unexposed portion is at least 30:1 when the glass is exposed to a broad spectrum mid-ultraviolet (about 308-312 nm) flood lamp to provide a shaped glass structure with an aspect ratio of at least 30:1, and to provide shaped glass structures with an aspect ratio much greater than 30:1 when the glass is exposed using a high powered energy source, such as a laser.

The glass structure may be patterned to create exposed regions of higher index of refraction surrounded by areas of lower index of refraction, such that light is substantially contained within the higher index of refraction material. Conversely, the patterned glass structure may be patterned to create exposed regions of higher index of refraction surrounding areas of lower index of refraction, such that light is substantially contained within the lower index of refraction material. Either way, exposing our glass with such ultraviolet light can raise index of refraction of the glass and the changed index of refraction may used to direct, manipulate, or process photons. Thus in some cases, etching of the glass is not necessary to direct light within such a patterned glass structure.

In some embodiments, the patterned glass structure is heated to above its glass transition temperature for between 10 minutes and 2 hours to allow the noble metal to coalesce and act as nuclei for devitrification in the exposed portion of the photosensitive glass substrate, and then the glass substrate is heated above its glass-ceramic transition temperature (at least 25 C above its glass transition temperature) for between 10 minutes and 2 hours. This provides for transformation of the exposed portion of the photosensitive glass substrate into a glass-ceramic during a subsequent cooling of the glass substrate. The glass substrate can then be etched in an HF-containing etchant solution, to give an etch ratio of exposed-portion to unexposed-portion of at least 30:1 in a shaped glass structure.

In some embodiments, a surface-smoothing acid containing at least one of nitric acid is used to dissolve surface metallic silver and/or hydrochloric acid is used to dissolve surface cerium metal is used during or after the HF etch, to reduce surface roughness of at least one micro-optic device in the shaped glass structure, such that light transmission through surfaces of a micro-optic device is increased. The final patterned glass structure may also be annealed near its glass transition temperature to smooth out etched side walls. Patterned glass structures that may be formed include micro-optic lenses, micro-optic micro-posts, and micro-optic waveguides such as micro-channels, micro-ridges (exposed glass is etched away to leave a glass micro-ridge), and index of refraction guides formed by patterned exposure of the glass.

In some embodiments, the patterned glass structure is processed by flood exposing to 300-320 nm light and heated to a temperature near its glass transformation temperature to allow at least part of the reduced noble metal to coalesce to provide a patterned glass structure is used to form larger clusters for at least one plasmon analytical technique, e.g. surface enhanced fluorescence, surface enhanced Raman spectroscopy, and surface plasmon resonance.

In some embodiments, the patterned glass structure forms at least part of a multilayer optical printed circuit board. This may also be a method to make a micro-optical interconnection apparatus, comprising: preparing a first photosensitive glass layer having a first glass transformation temperature and having a composition comprising: less than 76% silica, at least 0.0008% of at least one of a noble metal oxide and/or a copper oxide, at least 11% $Li_2O$, and at least 0.0014% $CeO_2$; exposing a first set of paths in the first photosensitive glass layer with ultraviolet light 240 to 360 nm light or a directed source of protons, while leaving at least a second portion of the first glass layer unexposed; depositing an ultraviolet-light reflecting-or-absorbing layer on the first layer; depositing a layer of non-photosensitive glass on the ultraviolet-light reflecting-or-absorbing layer; patterning and etching vias in the ultraviolet-light reflecting-or-absorbing layer and the non-photosensitive glass layer to provide light-coupling vias; depositing a second photosensitive glass layer on the patterned and etched non-photosensitive glass, the second photosensitive glass layer having a second glass transformation temperature and having a composition comprising, less than 72% silica, at least 0.008% of at least one of a noble metal oxide and a copper oxide, at least 11% $Li_2O$, at least 0.75% $B_2O_3$, and at least 0.0014% $CeO_2$, wherein the second photosensitive glass layer has a higher index of refraction than the non-photosensitive glass; exposing a second set of paths in the second photosensitive glass layer with ultraviolet light 300 to 320 nm light or a directed source of protons, while leaving at least a second portion of the second photosensitive glass layer unexposed; and heating the photosensitive glass layers to above their glass transformation temperatures to raise the index of refraction of the first and second sets of paths to render the sets of paths light-guiding.

This may also be a method to make a micro-optical interconnection apparatus, comprising: preparing a first photosensitive glass layer having a first glass transformation temperature; exposing a first set of paths in the first photosensitive glass layer with ultraviolet light 240 to 360 nm light or a directed source of protons, while leaving at least a second portion of the first glass layer unexposed; depositing an ultraviolet-light reflecting-or-absorbing layer on the first layer; depositing a layer of non-photosensitive glass on the ultraviolet-light reflecting-or-absorbing layer; patterning and etching vias in the ultraviolet-light reflecting-or-absorbing layer and the non-photosensitive glass layer to provide light-coupling vias; depositing a second photosensitive glass layer on the patterned and etched non-photosensitive glass, the second photosensitive glass layer having a second glass transformation temperature and having a composition comprising, less than 72% silica, at least 0.008% of at least one of a noble metal oxide and a copper oxide, at least 11% $Li_2O$, at least 0.75% $B_2O_3$, and at least 0.0014% $CeO_2$, wherein the second photosensitive glass layer has a higher index of refraction than the non-photosensitive glass; exposing a second set of paths in the second photosensitive glass layer with ultraviolet light 300 to 320 nm light or a directed source of protons, while leaving at least a second portion of the second photosensitive glass layer unexposed; and heating the photosensitive glass layers to above their glass transformation temperatures to raise the index of refraction of the first and second sets of paths to render the sets of paths light-guiding.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
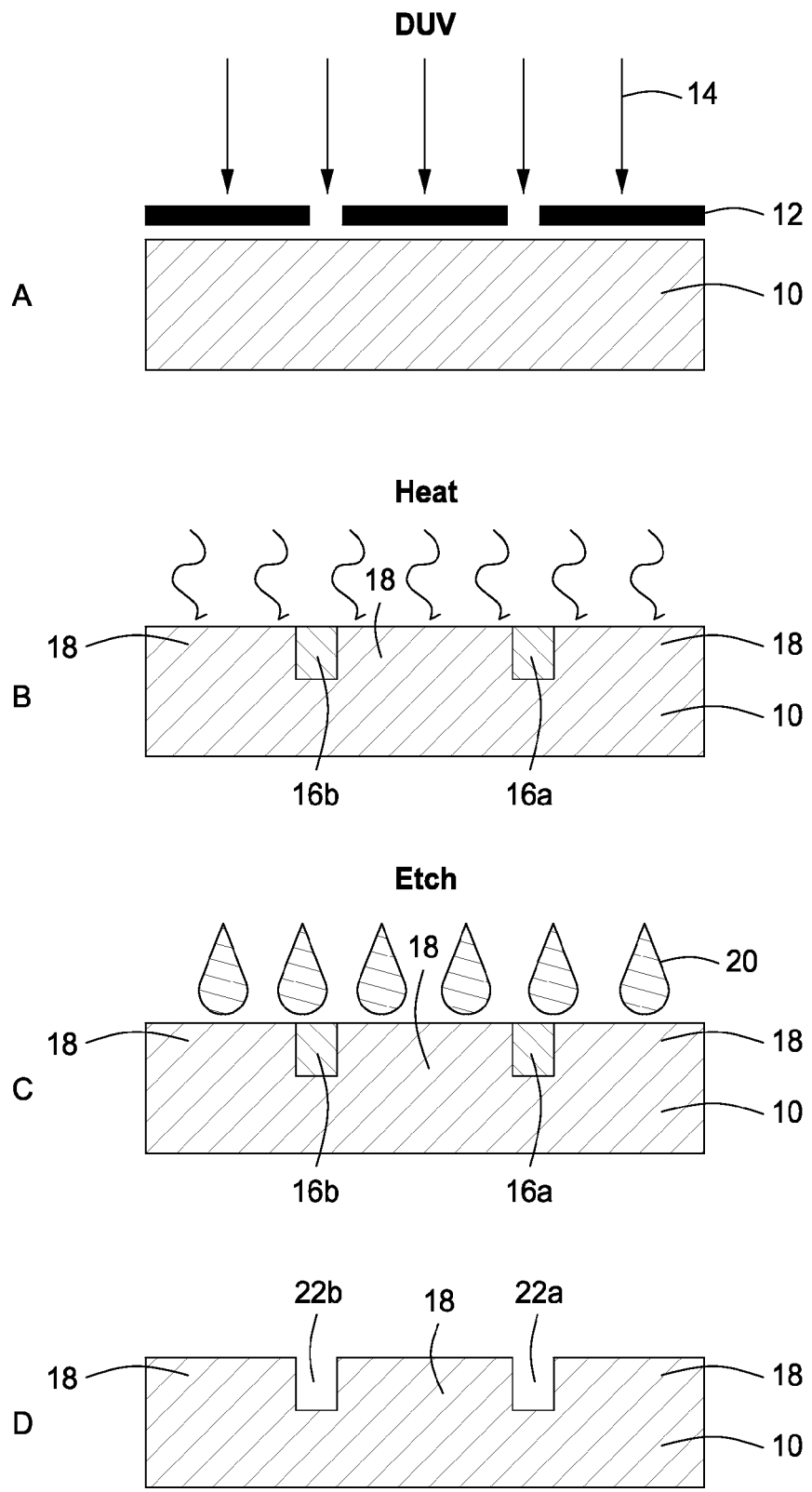
FIG. 1A is a first schematic of the processing of making high-precision glass micromachined structures of the present invention.
FIG. 1B is a second schematic of the processing of making high-precision glass micromachined structures of the present invention.
FIG. 1C is a third schematic of the processing of making high-precision glass micromachined structures of the present invention.
FIG. 1D is a fourth schematic of the processing of making high-precision glass micromachined structures of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not restrict the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Photoetchable glasses have several advantages for the fabrication of a wide variety of Microsystems components. Microstructures have been produced relatively inexpensively with these glasses using conventional semiconductor processing equipment. In general, glasses have high temperature stability, good mechanical properties, are electrically insulating, and have better chemical resistance than plastics and many metals. To our knowledge, the only commercially available photoetchable glass is FOTURAN®, made by Schott Corporation and imported into the U.S. only by Invenios Inc. FOTURAN® comprises a lithium-aluminum-silicate glass containing traces of silver ions. When exposed to UV-light within the absorption band of cerium oxide the cerium oxide acts as sensitizers, absorbing a photon and loosing an electron that reduces neighboring silver oxide to form silver atoms (Please see the chemical equation below).

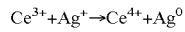

$$Ce^{3+}+Ag^+ \rightarrow Ce^{4+}+Ag^0$$

The silver atoms coalesce into silver nanoclusters during the baking process and induces nucleation sites for crystallization of the surrounding glass. If exposed to UV light through a mask, only the exposed regions of the glass will crystallize during subsequent heat treatment. This heat treatment must be performed at a temperature near the glass transformation temperature (e.g., greater than 465° C. in air for FOTURAN®). The crystalline phase is more soluble in etchants, such as hydrofluoric acid (HF), than the unexposed vitreous, amorphous regions. In particular, the crystalline regions of FOTURAN® are etched about 20 times faster than the amorphous regions in 10% HF, enabling microstructures with wall slopes ratios of about 20:1 when the exposed regions are removed. See T. R. Dietrich et al., "Fabrication technologies for Microsystems utilizing photoetchable glass," Microelectronic Engineering 30, 497 (1996), which is incorporated herein by reference.

Preferably, the shaped glass structure contains at least one of a micro-optic lens, a micro-optic micro-post, and a microchannel or micro-ridge micro-optic waveguide. The micro-ridge, optical waveguide may be formed by etching away exposed glass to leave a glass micro-ridge such that light is guided by the micro-ridge. The micro-ridge may be formed with a layer of photosensitive glass overlying a layer of non-photosensitive glass of lower index of refraction than the photosensitive glass, to substantially prevent light being guided by the micro-ridge from leaving the bottom of the micro-ridge in at least one portion of the micro-ridge. In some embodiments, a surface-smoothing acid containing at least one of nitric acid to dissolve surface metallic silver and hydrochloric acid to dissolve surface cerium metal is used during or after the HF etch, whereby surface roughness of at least one micro-optic device in the shaped glass structure is reduced and whereby light transmission through surfaces of a micro-optic device is increased.

FOTURAN® is described in information supplied by Invenios (the sole source U.S. supplier for FOTURAN®) is composed of silicon oxide ($SiO_2$) of 75-85% by weight, lithium oxide ($Li_2O$) of 7-11% by weight, aluminum oxide ($Al_2O_3$) of 3-6% by weight, sodium oxide ($Na_2O$) of 1-2% by weight, 0.2-0.5% by weight antimonium trioxide ($Sb_2O_3$) or arsenic oxide ($As_2O_3$), silver oxide ($Ag_2O$) of 0.05-0.15% by weight, and cerium oxide ($CeO_2$) of 0.01-0.04% by weight.

As used herein the term "APEX glass" or simply "APEX" is used to denote one embodiment of the composition of the present invention. Surprisingly, it was found that the compositions of the present invention may appear to be similar to FOTURAN®, however, the compositions of the present invention demonstrated a surprising sensitivity to ultraviolet light exposure of over three times that of the commercially available photosensitive glass, and yielded up to six times the etch rate more compared to FOTURAN® when both compositions were processed in the way recommended for FOTURAN® (with the exception of the reduced exposure and bake temperature used for APEX due to its greater sensitivity and lower glass transformation temperature). Further, APEX glass had an etch ratio of exposed portion to that of the unexposed portion of at least 30:1 to 40:1, while the best reported etch ratio of the commercially available FOTU- RAN® photosensitive glass exposed with a broad spectrum mid-ultraviolet flood lamp is about 20:1.

The reason for the dramatically improved result is not well understood. Not wanting to be bound by theory, it is believed that changes in the APEX composition provides three main mechanisms for its enhanced performance: (1) The higher amount of silver leads to the formation of smaller ceramic crystals which are etched faster at the grain boundaries, (2) the decrease in silica content (the main constituent etched by the HF acid) decreases the undesired etching of unexposed material, and (3) the higher total weight percent of the alkali metals and boron oxide produces a much more homogeneous glass during manufacturing. This facilitates more consistent performance across the substrate over large distances—but in any case, the results are surprising.

Kravitz et al. (U.S. Pat. No. 7,132,054), suggests that an even less expensive method of fabricating the microneedles is to replicate them using a negative mold made from the original glass hollow microneedle array structure, as follows: "A negative mold can be made by depositing a mold material onto the glass hollow microneedle array. For example, a negative mold of FOTURAN®. Microneedles can be made by electroplating a metal (e.g., nickel, copper, or gold) onto a sputtered seed layer deposited on the FOTURAN®microneedles. After the negative plated mold is created and released from the glass array, a liquid polymer, such as Zeonor 1020R, can be cast into the mold. After the Zeonor 1020R is cooled and solidified, the polymeric hollow microneedle array can be easily peeled off the plated negative mold and the mold can be re-used. Other plastics that can be hot embossed or injection molded, such as polycarbonate, can also be used." Such an approach can be improved by using APEX.

Alternatively, a negative mold can be made directly of the photoetchable glass, as shown in their FIGS. 7A and 7E of Kravitz, et al.'s U.S. Pat. No. 7,132,054. A similar process can be used with our glass composition, and Kravitz, et al.'s U.S. Pat. No. 7,132,054 is hereby incorporated by reference. The composition of the present invention is a glass composition referred to herein as "APEX glass" or simply "APEX".

FIGS. 1A-D are schematics of the processing of making high-precision glass micromachined structures with etch ratios of 30:1 to 50:1 of the present invention. FIG. 1A is an illustration of the substrate 10 that is partially covered by the mask 12 and treated with an emissions radiation 14. The emissions radiation 14 may be of a variety of types including mid-ultraviolet radiation from a mid-ultraviolet flood exposure system or laser emission from a laser-based exposure system. For example, the emission may be approximately 308 to 312 nm; but the skilled artisan will recognize that other wavelengths (50-100, 100-150, 150-200, 200-250, 250-300, 300-400, 400-500, 500-600, 600-700, 700-800, 800 nm or above) may be used.

FIG. 1B is an illustration of the substrate 10 that has been partially covered by the mask (not shown) and treated with an emissions radiation (not shown) to produce exposed areas 16A and 16B and unexposed areas 18. The substrate 10 is then heated to a temperature near the glass transformation temperature to transform at least part of the exposed glass to a crystalline material.

FIG. 1C is an illustration of the substrate 10 treated with an etching solution. The substrate 10 includes crystalline material regions 16A and 16B and unexposed regions 18. The substrate 10 is treated with an etchant 20 to etch the crystalline material regions 16A and 16B. The etching process results in etch ratio of exposed portion to that of the unexposed portion is at least 30:1 when exposed with a broad spectrum mid-ultraviolet flood light, and greater than 30:1 when exposed with a laser, to provide a shaped glass structure with an anisotropic-etch ratio of at least 30:1. In some embodiments, the etchant 20 is HF, in some embodiments the etchant 20 is a combination of HF and additional ingredients, such as hydrochloric acid or nitric acid.

FIG. 1D is an illustration of the substrate 10 treated with an etching solution to remove the crystalline material regions (not shown) to leave the etched areas 22A and 22B in the unexposed regions 18.

Figure 2A:
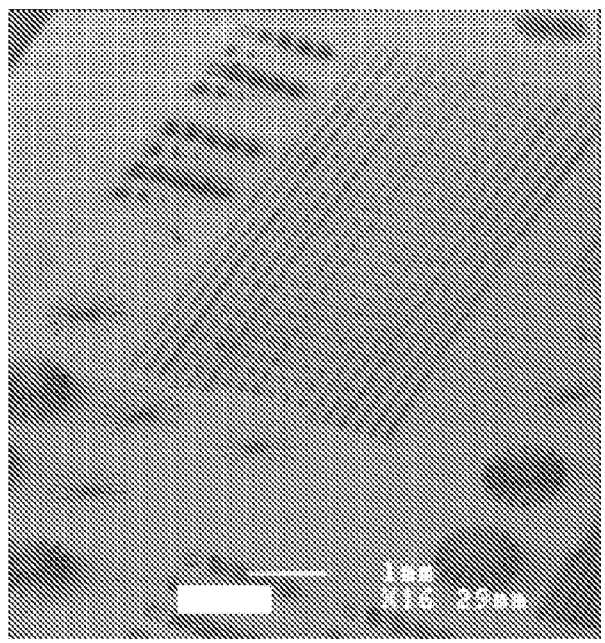
FIGS. 2A-2B are Field Emission Microscopy (FEM) images of the high-precision glass micromachined structures of the present invention.
Figure 2B:
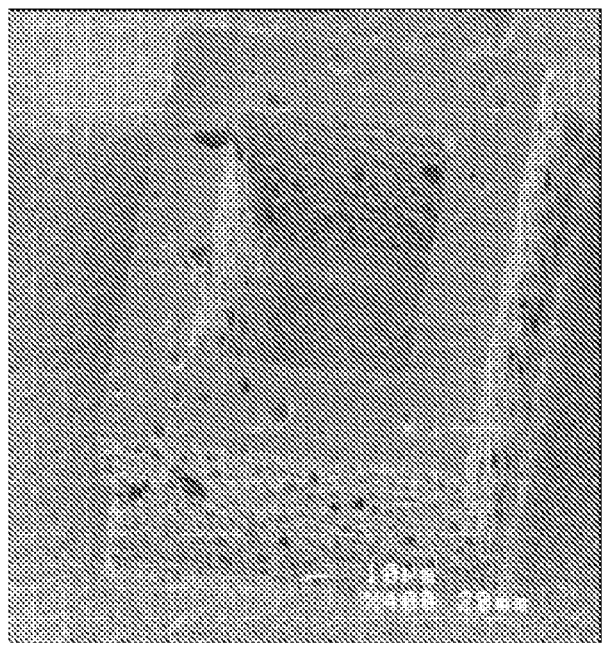
Figure 3A:
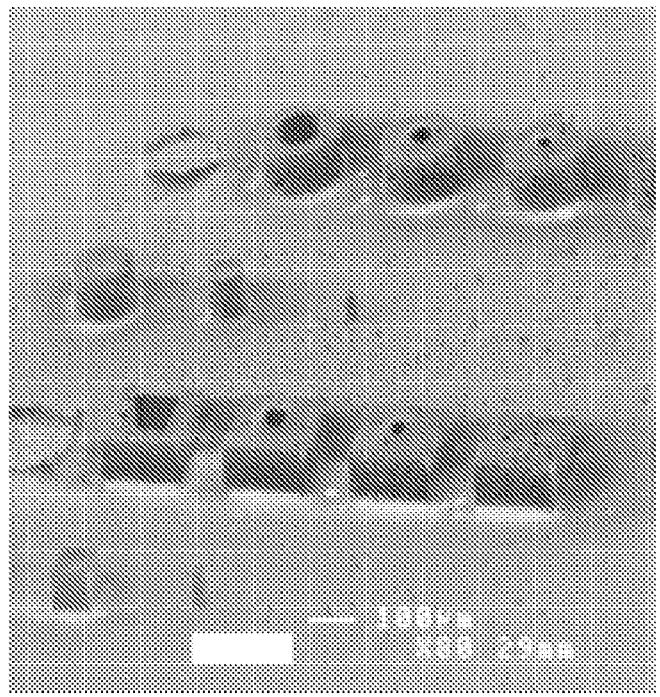
FIG. 3A is a first FEM image of the high-precision glass micromachined structures of the present invention.
Figure 3B:
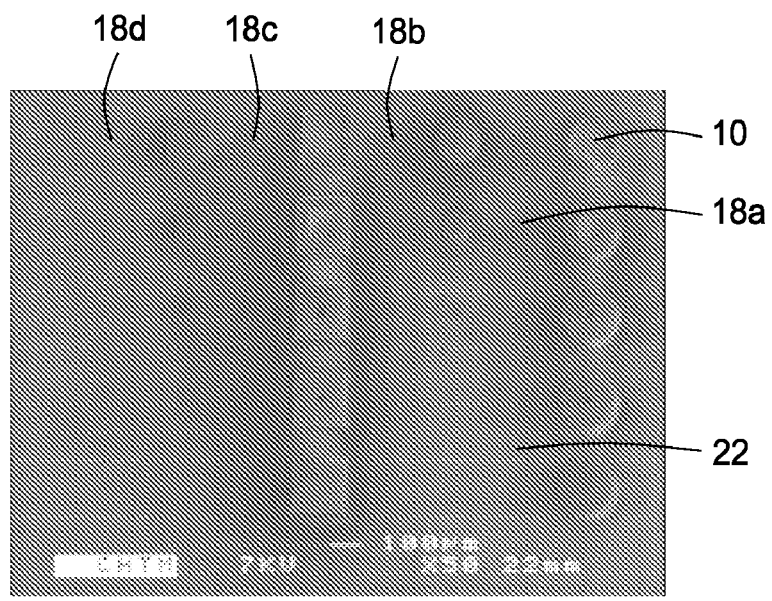
FIG. 3B is a second FEM image of the high-precision glass micromachined structures of the present invention.
Figure 3C:
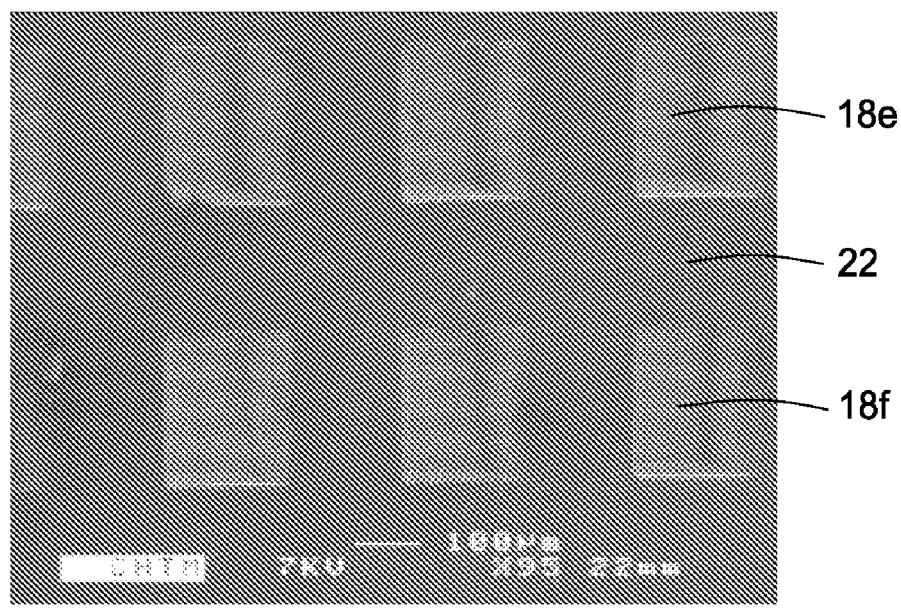
FIG. 3C is a third FEM image of the high-precision glass micromachined structures of the present invention.
Figure 3D:
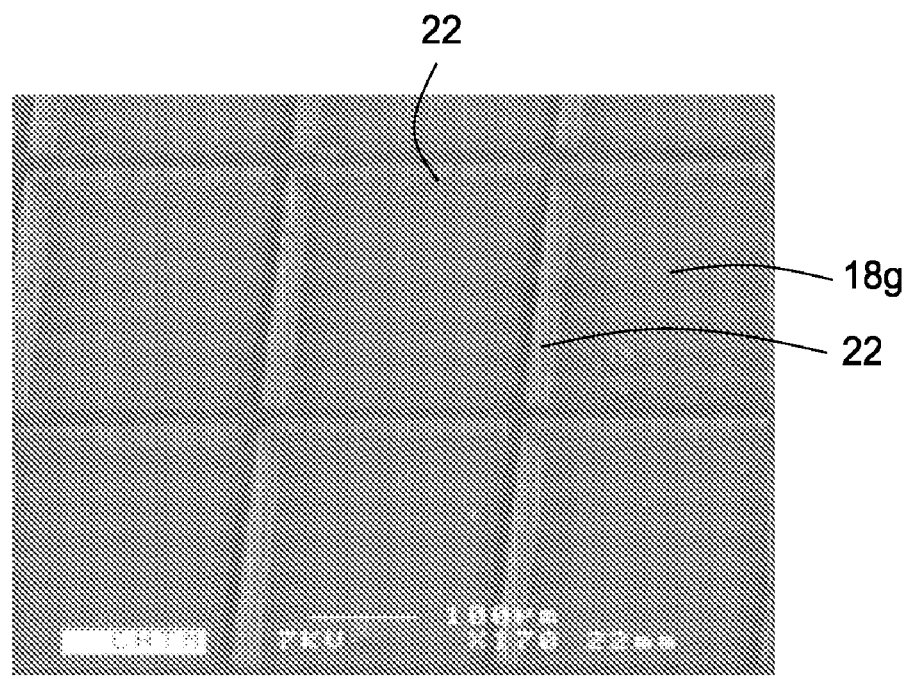
FIG. 3D is a fourth FEM image of the high-precision glass micromachined structures of the present invention.

FIGS. 2A-2B are FEM images of the high-precision glass micromachined structures of the present invention. FIGS. 3A-3D are FEM images of the high-precision glass micromachined structures of the present invention. FIGS. 3A and 3B are FEM images that illustrate 4 different examples of types of micromachined structures 18a-18d. The micromachined structures 18a-18d are evident from the etched areas 22. FIG. 3C is an FEM image that micromachined structures 18e-18f which is evident from the etched areas 22. FIG. 3D is a FEM image that micromachined structures 18g which is evident from the etched areas 22.

Figure 4A:
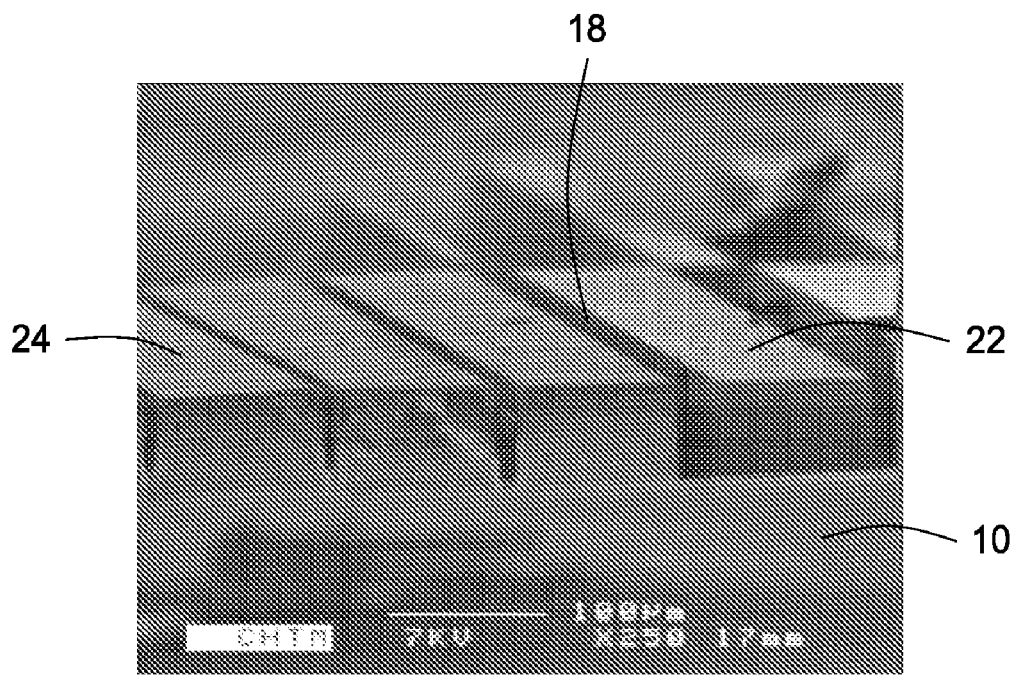
FIGS. 4A-4B are FEM images of the high-precision glass micromachined structures of the present invention.
Figure 4B:
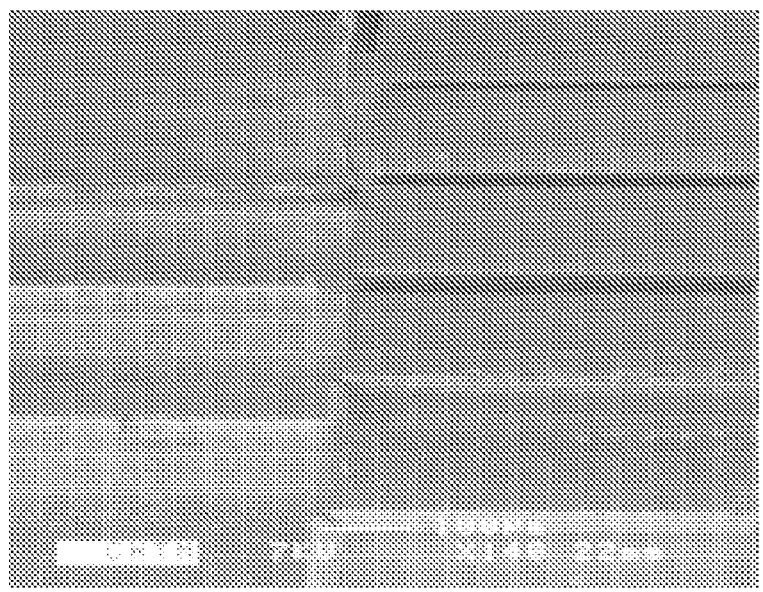

FIGS. 4A-4B are FEM images of the high-precision glass micromachined structures of the present invention. FIG. 4A is an FEM image that illustrates micromachined structures 18 having etched areas 22 that produce a gap 24 between the unexposed regions that form the micromachined structures 18. In FIG. 4A the gap 24 is 10 microns wide between adjacent micromachined structures 18 and about 50 microns deep. FIG. 4B is a FEM image of the high-precision glass micromachined structures of the present invention.

Figure 5A:
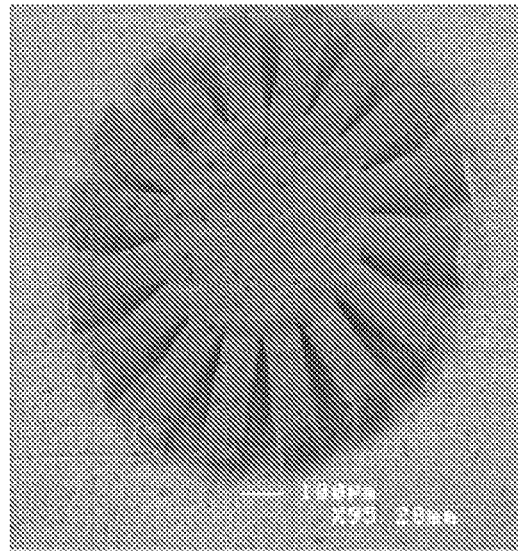
FIG. 5A is a first FEM image of a high-precision glass micromachined flower of the present invention.
Figure 5B:
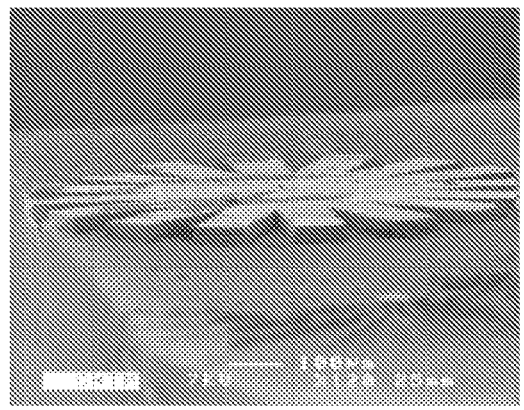
FIG. 5B is a second FEM image of a high-precision glass micromachined flower of the present invention.
Figure 5C:
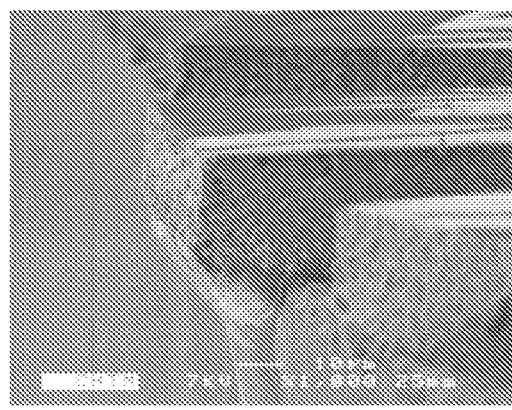
FIG. 5C is a third FEM image of a high-precision glass micromachined flower of the present invention.

FIGS. 5A-5C are FEM images of a high-precision glass micromachined flower that illustrate some of the capability of the present invention. FIGS. 5A and 5B are FEM images that illustrates micromachined flower 18 having etched areas 22 between the unexposed regions that form the micromachined flower 18. FIG. 5C is a higher magnification FEM image of a high-precision glass micromachined flower 18 of the present invention. It is clear from the extremely smooth top surface that the non-exposed surfaces 18 etches extremely slowly compared to the exposed area of the gap 24.

Figure 6A:
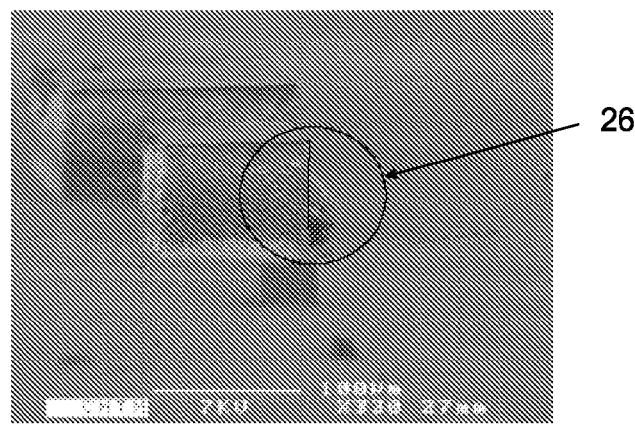
FIGS. 6A-6B are FEM images of a high-precision glass micromachined structures of the present invention.
Figure 6B:
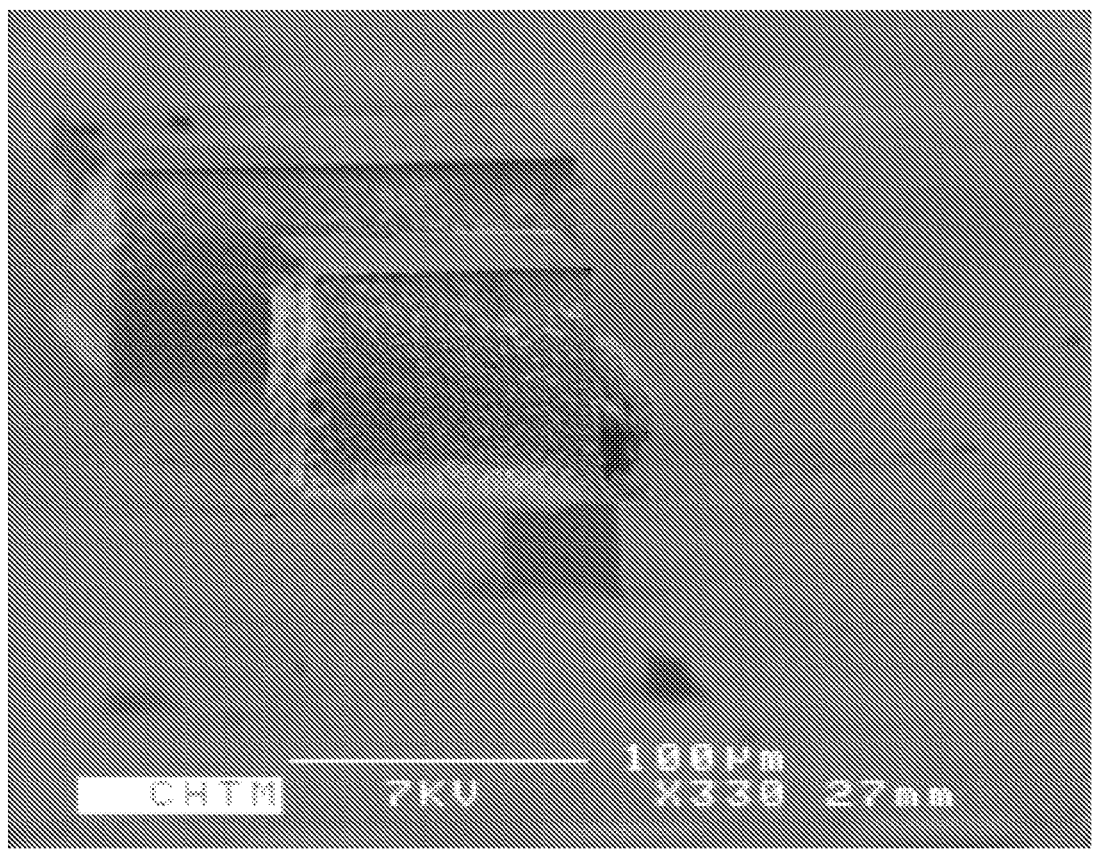

FIGS. 6A-6B are FEM images of a high-precision glass micromachined structures of the present invention. FIG. 6A is an FEM image that illustrates micromachined bricks 18a and 18b having etched areas 22 between the unexposed regions that form the micromachined bricks 18a and 18b. The analysis area 26 is magnified in FIG. 6B. The aspect ratio of the micromachined brick 18a can be calculated by comparing the vertical line height to the horizontal line height; and result in this example to have an aspect ratio of about 27:1.

Figure 7:
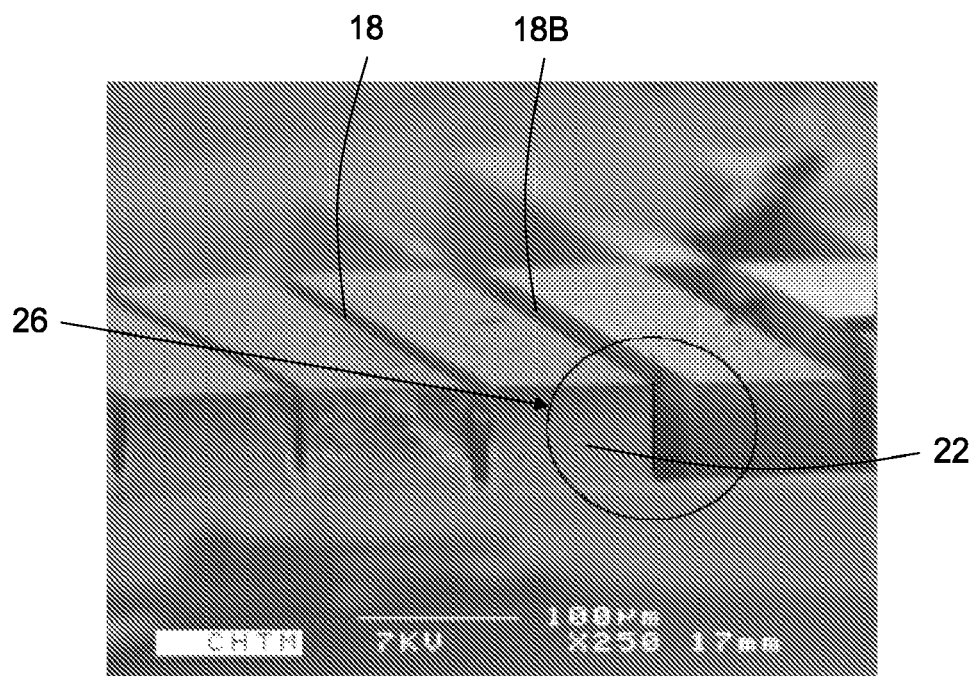
FIG. 7 is a FEM image of a high-precision glass micromachined structures of the present invention.

FIG. 7 is a FEM image of a high-precision glass micromachined structures of the present invention. FIG. 7 is an FEM image that illustrates micromachined bricks 18a and 18b having etched areas 22 between the unexposed regions that form the micromachined bricks 18a and 18b. The analysis area 26 shows that the aspect ratio of the micromachined brick 18a can be calculated by comparing the vertical line height to the horizontal line height to have an aspect ratio of about 27.66:1.

Figure 8:
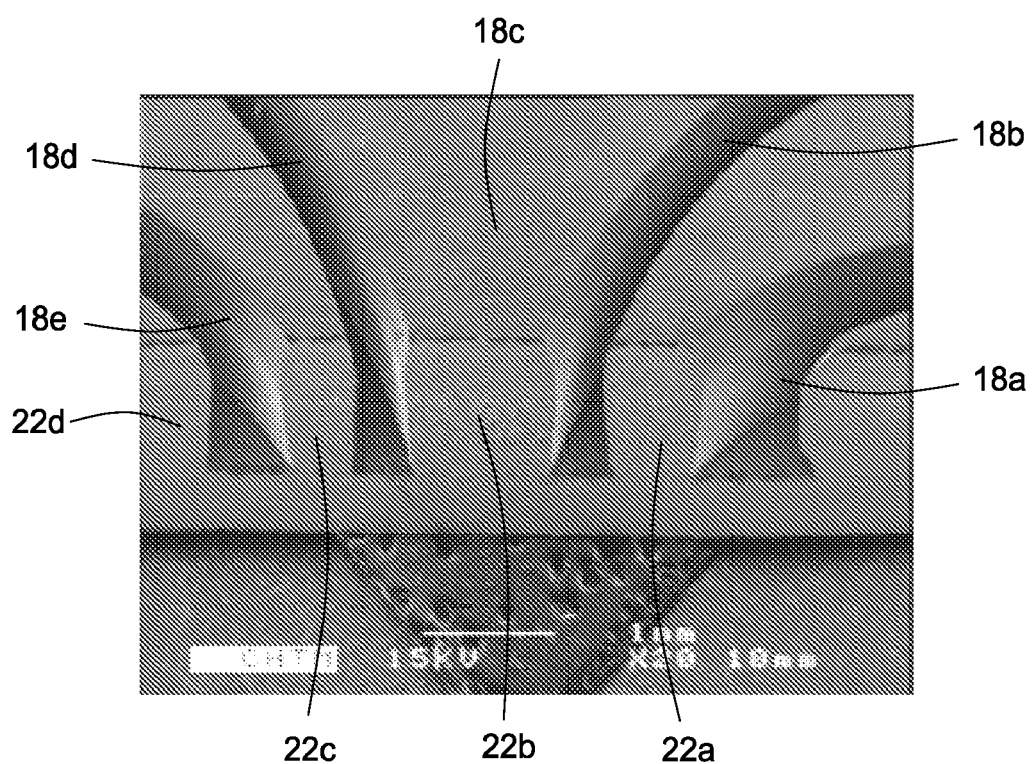
FIG. 8 is a FEM image of a high-precision glass micromachined structures of the present invention.

FIG. 8 is a FEM image of a high-precision glass micromachined structures of the present invention. FIG. 8 is an FEM image that illustrates micromachined structures 18a, 18b, 18c, 18d and 18e having etched areas 22a-22d between the unexposed regions 18a, 18b, 18c, 18d and 18e. The profile of the walls formed by the etched areas 22a-22d and the unexposed regions 18a, 18b, 18c, 18d and 18e can be seen.

Figure 9A:
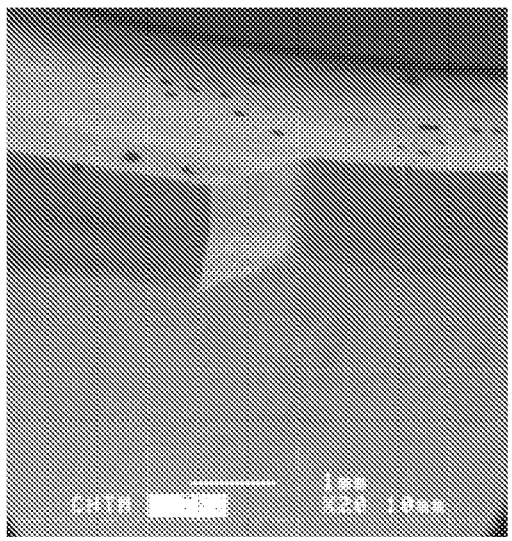
FIGS. 9A and 9B are FEM images giving a side view of a throughetched microchannel.
Figure 9B:
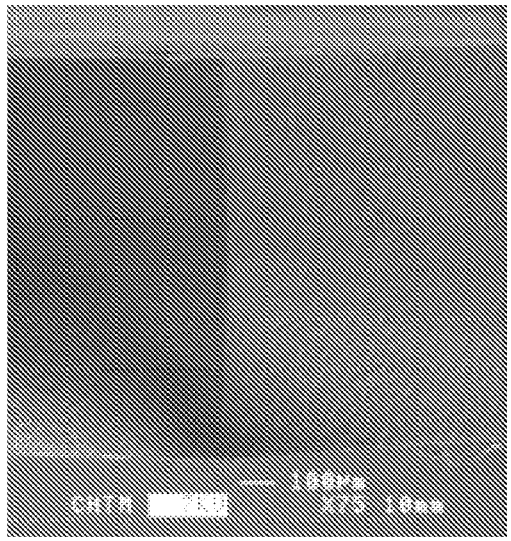

FIGS. 9A and 9B are FEM images giving a side view of a through-etched 100 μm wide microchannel (one half of walls removed for FEM analysis). FIG. 9B is an image that shows the smooth sidewall and top surfaces with very crisp edges.

Figure 10A:
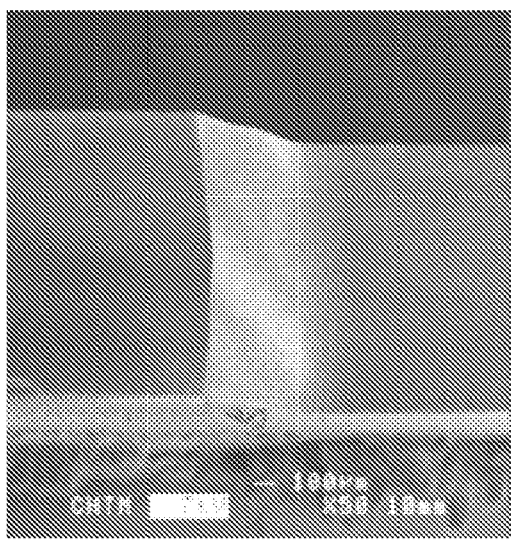
FIGS. 10A and 10B are FEM images giving a side view of a throughetched microchannel.
Figure 10B:
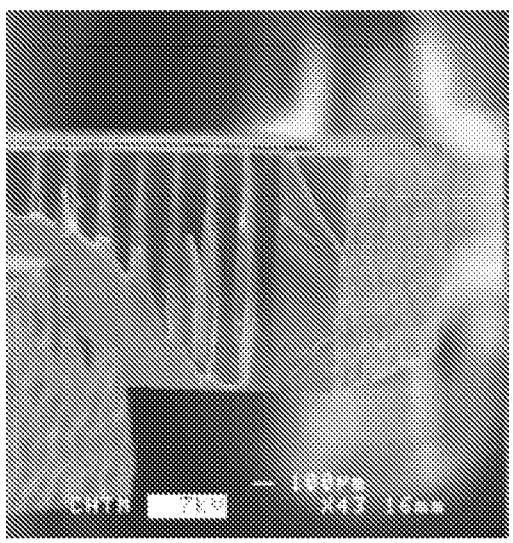

FIGS. 10A and 10B are FEM images giving a side view of a through-etched 100 μm wide microchannel (one half of walls removed for FEM analysis). FIG. 10B is an image of a cross section of etched vias, 100 μms in diameter and 1 mm tall.

The glass structure may be patterned to create exposed regions of higher index of refraction surrounded by areas of lower index of refraction, such that light is substantially contained within the higher index of refraction material. Conversely, the patterned glass structure may be patterned to create exposed regions of higher index of refraction surrounding areas of lower index of refraction, such that light is substantially contained within the lower index of refraction material. Either way, exposing our glass with such ultraviolet light can raise index of refraction of the glass such and the changed index of refraction may used to direct, manipulate, or process photons. Thus in some cases, etching of the glass is not necessary to direct light within such a patterned glass structure. The degree to which the index of refraction is changed can be varied through a simple bake process where the glass structure is heated near its glass transition temperature for between 10 minutes and 18 hours allowing the atomic silver to coalesce into larger silver clusters.

In some embodiments, a surface-smoothing acid containing at least one of nitric acid is used to dissolve surface metallic silver and/or hydrochloric acid is used to dissolve surface cerium metal is used during or after the HF etch, to reduce surface roughness of at least one micro-optic device in the shaped glass structure, such that light transmission through surfaces of a micro-optic device is increased. The final patterned glass structure may also be annealed past its glass transition temperature to smooth out etched side walls.

Patterned glass structures that may be formed include micro-optic lenses, micro-optic micro-posts, and micro-optic waveguides such as micro-channels, micro-ridges (exposed glass is etched away to leave a glass micro-ridge), and index of refraction guides formed by patterned exposure of the glass (with or without baking).

The glass substrate may also be heated to a temperature in excess of the glass transformation temperature to allow at least part of the reduced noble metal to coalesce to provide a patterned glass structure is used to form larger clusters for at least one plasmon analytical technique, e.g. surface enhanced fluorescence, surface enhanced Raman spectroscopy, and surface plasmon resonance.

In some embodiments, the patterned glass structure forms at least part of a two or more layer optical printed circuit board. This may also be a method to make a micro-optical interconnection apparatus, comprising: preparing a first photosensitive glass layer having a first glass transformation temperature and having a composition comprising: less than 72% silica, at least 0.0008% of at least one of a noble metal oxide and/or a copper oxide, at least 11% Li2O, and at least 0.0014% CeO2; exposing a first set of paths in the first photosensitive glass layer with an activating energy source, such as an ultraviolet light (240 to 360 nm) or a directed source of protons, while leaving at least a second portion of the first glass layer unexposed; depositing an ultraviolet-light reflecting-or-absorbing layer on the first layer; depositing a layer of non-photosensitive glass on the ultraviolet-light reflecting-or-absorbing layer; patterning and etching vias in the ultraviolet-light reflecting-or-absorbing layer and the non-photosensitive glass layer to provide light-coupling vias; depositing a second photosensitive glass layer on the patterned and etched non-photosensitive glass, the second photosensitive glass layer having a second glass transformation temperature and having a composition comprising, less than 76% silica, at least 0.008% of at least one of a noble metal oxide and a copper oxide, at least 11% Li2O, at least 0.75% B2O3, and at least 0.0014% CeO2, wherein the second photosensitive glass layer has a higher index of refraction than the non-photosensitive glass; exposing a second set of paths in the second photosensitive glass layer with an activating energy source, such as ultraviolet light (300 to 320 nm) or a directed source of protons, while leaving at least a second portion of the second photosensitive glass layer unexposed; and heating the photosensitive glass layers to above their glass transformation temperatures to raise the index of refraction of the first and second sets of paths to render the sets of paths light-guiding.

While light can go from layer to layer vertically through vias, in some preferred embodiments light goes from layer to layer at a non-vertical angle. Light may be transferred through an elongated via using the same index of refraction in touching upper and lower light-guiding paths that overlap for some distance. Light may also be transferred through a less elongated via using a slightly higher index of refraction (higher than the touching upper and lower light-guiding paths) using 3-D patterning. The higher index of refraction can be produced by higher 3-D exposure using orthogonal laser beams focused on a series of points to create a pattern of higher index of refraction points leading between upper and lower light-guiding paths. The 3-D exposure can also create other structures, including corners of reduced radius (as compared to corners of constant index of refraction), polarizers, and diffraction gratings.

General Photoactive Glass Manufacturing Design Rules:

Boron Oxide and Aluminum oxide basically conduct the same task within the glass melt. Boron oxide may also be in the form of anhydride boric acid ($H_3BO_3$), Borax Frits, Gerstley Borate/Colemanite, Boric Acid, Borax, and Ulexite. A 13 weight % represents the high end of $B_2O_3$ in borosilicate glasses. Boron Oxide concentration range: Up to 13 weight %. Aluminum oxide may be in the form of Alkali containing feldspars (such as Albite, $NaAlSi_3O_8$) or alumina hydrate. $Al_2O_3$ may be added by using kaolin or nepheline syenite (which contains feldspar). Up to 8 weight %. This represents the high end of $Al_2O_3$ in borosilicate glasses.crystallization Aluminum Oxide concentration range: up to 7 weight %. Or more appropriately, the combination of Boron Oxide and Aluminum Oxide should not exceed 13 weight %.

Potassium Oxide and Sodium Oxide basically conduct the same task within the glass melt. Potassium oxide: Helps lower melting point. Sometimes used to replace sodium in soda lime glasses. Range up to 16 weight % as well. May also be Potash ($K_2CO_3$). If used to replace $Na_2O$, typically makes the glass more chemically resistant.

Potassium Oxide concentration range: up to 16 weight %. Sodium oxide helps lower melting point. Range up to 16 weight % (common high end for soda lime glass). May also be soda ash ($Na_2CO_3$) or Glauber's Salt ($Na_2SO_4$). Sodium oxide concentration range: up to 16 weight %. Or more appropriately, the combination of these two should not exceed 16 weight %. Silica: concentration range: 60-85 weight %.

Zinc oxide: Improves chemical resistance, lowers thermal expansion, adds elasticity. Works similarly with CaO. Up to 18 weight % in E-Glass. Zinc Oxide concentration range: up to 18 weight %. Lithium Oxide: Aids in nucleation. Can be lithium carbonate. Lithium Oxide concentration range: 8-15 weight %.

Cerium Oxide: Electron Donor. Cerium oxide concentration range: up to 0.1 weight %. Antimonium trioxide: Oxygen donor. Antimonium trioxide ($Sb_2O_3$) concentration range: up to 0.5 weight %. Arsenic Oxide: Oxygen donor. Arsenic oxide ($As_2O_3$): Electron Donor. Arsenic Oxide concentration range: up to 0.1 weight.

Silver Oxide concentration range: up to 1 weight %. Gold Oxide concentration range: up to 1 weight %. Copper Oxide concentration range: up to 2 weight %.

The above ingredients might be at least partially replaced with the following compounds:

Calcium Oxide: Improves chemical resistance, lowers thermal expansion, adds elasticity. Works similarly with ZnO. Up to 18 weight % in E-Glass. Calcium Oxide concentration range: up to 18 weight %. Magnesium Oxide: This is the upper end in E-glass. May be in the form of $MgCO_3$. Magnesium oxide concentrate range: up to 10 weight %. Barium Oxide Improves refractive index of the material without increasing the dispersive power. Used as a replacement for lead or lime. May also come in the form of $BaCO_3$. Barium Oxide concentration range: up to 18 weight %. Lead Oxide: Improves refractive index of the material with out increasing the dispersive power. Lead Oxide concentration range: up to 18 weight %.

Iron may be added to the melt to make the material paramagnetic (e.g. $Fe_2O_3$). Iron oxide may additionally be used to quench intrinsic autofluorescence of other compounds within the glass. Iron Oxide Concentration range: up to 5 weight %.

Processing parameters. Patterning of the selected area(s) by at least one process step selected from the group consisting of:

Exposure-Exposing the glass substrate to an activating energy source, such as 310 nm light or a directed source of protons.

High anisotropic-etch ratios may be obtained using the photoactive glass of the present invention using a total activation energy between 0.4 $J/cm^2$ and 4 $J/cm^2$ of 310 nm light. In contrast, FOTURAN® sometimes requires up to 54 $J/cm^2$ activation energy to create a uniform exposure across large distances (i.e., inches).

Baking—Baking typically occurs in a two step process. Temperature 1 allows for the coalescing of silver ions into silver nanoparticles and temperature 2 allows for the lithium oxide to form around the silver nanoparticles. However, we have been successful in doing a single ramp step.

Etching—Etching is done in an HF solution, typically 5-10% by volume. However, we can also add other fluids to the etch solution. For example, we can add hydrochloric or nitric acid to the etch solution. We've had good success in using this solution to obtain a smoother etch because it dissolves the silver nanoparticles. This etch is especially useful in the fabrication of structures and devices that require a smooth surfaces, such as micro-lenses and micro-channels (e.g. to guide fluids).

In the fabrication of the micro-channels and many MEM's devices many times it is important to have the ability to hermetically seal more than one layer together. In the case of the micro-channel these layers may consist of a top and/or bottom lid with at least one section containing the actual micro-channel. The hermetic seal is important for fluid or gas retention. APEX has been shown to bonds to itself between temperatures of 450 C and 565 C creating a hermetic seal and bonding in such a way that two individual pieces of glass become one piece of glass, making a solid device. The temperatures used to bond APEX to itself are low enough that many metallization procedures done prior to the bonding step will not be affected by the elevated temperature.

The photoactive glass of the present invention can be used to make micro-posts (μPosts), electroposts, micro-optics, micro-lenses, micro-waveguides for the directed moving of light, and micro-channels for the directed moving of fluids.

The μPosts can be optically transparent micron-scaled posts that painlessly penetrate into the epidermal or dermal layers of skin allowing for optical interrogation of the surrounding tissue.

μPost usages include: (1) In vivo optical preconcentration/detection of low abundant compounds; used for a feedback control loop for medicines; uses the heart for continued blood turnover. (2) Detection of large molecular weight compounds using FTIR, SERS, in vivo ELISAs, etc.

ElectroPosts can be electrically conductive micron-scaled posts that painlessly penetrate into the epidermal or dermal layers of skin allowing for the electrochemical interrogation of the surrounding tissue. The conductive posts can be cast using an APEX mold or a mold made using an APEX pattern, or with metal-plated APEX. ElectroPosts can be made via micro-wire EDM.

μPost usages include: (1) In vivo preconcentration/detection of low abundant compounds; used for a feedback control loop for medicines; uses the heart for continued blood turnover. (2) Use conducting μPosts to measure conductivity. This allows the doctor to identify where (epidermal/dermal) the tip of the analytical μPost is. (3) Use conducting posts (e.g. one or more metal plated μPosts to measure conductivity) included with μPosts. This allows the doctor to identify where (epidermal/dermal) the tip of the analytical μPost.

In the Kravitz et al. patent μPosts were fabricated out of FOTURAN®, a photo-definable glass, in a three-step process of expose, bake, and etch. Areas of exposed glass are more soluble in dilute hydrofluoric acid. There are four main reasons why FOTURAN® micro-structures provide added benefit over other emerging technologies for non-invasive diagnostics (i.e. microneedles, transdermal spectroscopy). First, FOTURAN® is capable of making high anisotropic-etch ratio features. μPosts with anisotropic-etch ratios greater than 8:1 are easily obtained. With these high anisotropic-etch ratios, the μPosts are able to easily penetrate into the skin without significant use of force.

Additionally, because FOTURAN® is a glass it has greater structural integrity than traditional materials, such as silicon or plastic. In further attempts to decrease the likelihood of post shearing inside a patient, the present inventors have been successful in creating metal reinforced μPosts capable of withstanding more then 50 mN/post of shear force. Another advantage FOTURAN® μPosts have over other emerging technologies is that diagnostics are performed within the patient. By coating the tips of the μPosts with capture proteins and placing the analytical patch into a patient, the capture proteins are placed in intimate contact with the sensing region of interest. With this approach the present inventors avoid the complicated extraction of fluids to secondary analysis systems, such as with microneedles. FOTURAN® is glass-based, it is transparent in portions of the electromagnetic spectrum important in spectroscopy (e.g. 400 nm-11100 nm). These optically transparent μPosts will provide the basis of a robust platform for the first minimally invasive in-vivo diagnostic platform capable of recording events deep in the dermal layers of a patient's skin. Again, similar use with our APEX glass the photoactive glass of the present invention can be used to make micro-posts can give an even better device.

TABLE 1

Comparison of performance metrics

| Description Number | Processing Metrics | APEX | Commercially Available Photoactive Glass |
|---|---|---|---|
| 1 | Aspect ratio | +++* | |
| 2 | Etch rate | +++ | |
| 3 | Pattern resolution | + | + |
| 4 | Energy required for adequate formation of atomic silver | +++ | |
| 5 | Forgiveness to overexposure | | + |
| 6 | Minimum feature pitch | + | |
| 7 | Adjacent large and small features | + | + |
| 8 | Etch consistency across substrate | ++++ | |
| 9 | Etch rate of non-exposed regions | +++ | |
| 10 | Max etch depth | + | |
| 11 | Transparency of non-exposed regions after etch | ++ | |
| 12 | Ability to thermally bond to itself | ++ | |
| 13 | Total processing time | ++ | |

*The greater the "+", the higher the degree of differentiation in favor of the noted glass.

Below is an elaboration of Table 1 above and the processing metrics presented. This table is meant to represent qualitative advantages or disadvantages of the photoactive glass of the present invention versus a commercially available photoactive glass and the skilled artisan will recognize that it is not meant to convey absolute values.

Aspect ratio: Aspect ratios greater than 30:1 have been produced using a broad spectrum mid-ultraviolet flood lamp. This is, for example, 50% more than reported and observed values for the commercially available photoactive glass.

Etch rate: Etch rates of ceramic regions range between 10-150 μm/minute for the photoactive glass of the present invention, compared to 1-20 μm/min for the commercially available photoactive glass. This faster etch rate aids in creating high aspect ratios and preservation of crisp features and transparency of non-exposed glass regions.

Pattern resolution: Both glasses present similar ability to create large (i.e. millimeter regime) and small features (i.e. double digit micrometer regime).

Energy required for adequate formation of atomic silver: This is very important for laser-based exposure systems. Since APEX has a higher sensitivity, smaller energy levels are required to facilitate the formation of atomic silver formation—without sacrificing feature formation.

Forgiveness to overexposure: The commercially available photoactive glass has a greater ability to accept a larger amount of delivered light energy without pattern bleed-over.

Minimum feature pitch: This is defined as how close features can be placed together. Our studies have shown the photoactive glass of the present invention has a slight advantage in placing very small features adjacent to one another.

Adjacent large and small features: This is defined as placing small (i.e. micron sized features) next to large (i.e., millimeter sized features). Both glasses present similar results.

Etch consistency across substrate: This may be defined as pattern yield. The photoactive glass of the present invention has been demonstrated to provide very similar structures across large distances (i.e. 4 inches). This is extremely important in product manufacturing since high yields translate to lower overall costs. Not wanting to be bound by theory, it is believed that the increased concentration of alkali metals and boron oxide aid in creating a more homogeneous glass mixture, which leads to more consistent results across relatively large distances (inches vs. microns) on the substrate.

Etch rate of non-exposed regions: This processing metric helps in the creation of high aspect-ratio features, as unexposed material (present in the glass state) are not preferentially etched. Not wanting to be bound by theory, it is believed that the lower silica content in the glass decreases its susceptibility to etching (e.g. via acids, such as HF).

Max Etch Depth: This is defined as how deep into the substrate patterns can be created. The photoactive glass of the present invention has the ability to create deeper features, for example greater than 2 mm etch depth.

Transparency of non-exposed regions after etch: Due to the observed decrease etch rate of non-exposed regions, the glass remains more transparent.

Ability to thermally bond to itself: This is important when creating multi-layered substrates, like that used in more complex devices (e.g. Microelectromechanical Systems (MEMs)/Biological MEMs/semiconductor packaging, etc.) The photoactive glass of the present invention provides a more consistent thermal bond at a lower temperature than commercially available photoactive glass.

Decreased processing time: This becomes important in production environments where reduced processing usually translates into lower unit costs. Due to several of the features described above, the photoactive glass of the present invention can be processed in a more rapid and efficient manner compared to other commercially available photoactive substrates.

Table 2, below summarizes modern photosensitive glass compositions and various compositions of the present invention. While photosensitive glasses have been known for some time (e.g. patents S. D. Stookey: "Photosensitively Opacifiable Glass" U.S. Pat. No. 2,684,911 (1954), and also U.S. Pat. Nos. 2,628,160 and 2,971,853 covering products sold as Fotoform and Fotoceram, and sometimes described with broad composition ratios, e.g., Speit and U.S. Pat. No. 5,078,771 by Wu), etch ratios apparently have only been evaluated for FOTURAN®, see Dietrich et al. and Livingston, et al., above. Note that for practical purposes anisotropic-etch ratios are easily and accurately measurable. Note also that wall slope angles are difficult to measure directly. E.g. Dietrich et al. give a relatively broad range of 2-4 degrees for their wall slope angle corresponding to a 20:1 etch ratio. Aspect ratios may be calculated using the following approach: The sine of wall slope angle is equal to the unexposed etch rate divided by the exposed etch rate. Dietrich et al.'s wall slope angle was calculated at 1:20 (or 0.05) unexposed to exposed etch ratio, and thus is about 3 degrees (Sine of 3 degrees=0.052).

TABLE 2

| Formula | Corning 8603 Fotoform Fotoceram | PEG3 | Schott-Speiton FOTURAN® | Dietrich (commercially available as FOTURAN®) | U.S. Pat. No. 5,374,291 | Test 1 Photosenitive Glass #1 |
|---|---|---|---|---|---|---|
| $B_2O_3$ | | | | | | 0.75 |
| $K_2O$ | 4.10% | 4.00% | | 3-6% | trace** | 6 |
| $SiO_2$ | 79.60% | 78.00% | 60-85% | 75-85% | 70-84% | 71.66 |
| $Al_2O_3$ | 4.00% | 6.00% | 2-25%* | 3-6% | 3-10% | 6 |

TABLE 2-continued

| | | | | | | |
|---|---|---|---|---|---|---|
| Na₂O | 1.60% | 1.00% | | 1-2% | trace** | 2 |
| ZnO | | 1.00% | | 0-2% | trace** | 2 |
| Li₂O | 9.30% | 10.00% | 5.5-15%* | 7-11% | 5-20% | 11 |
| CeO₂ | 0.014% | 0.080% | 0.001-0.01 | 0.01-0.04% | 0.01-0.1% | 0.04 |
| Sb₂O₃ | 0.400% | | | 0.2-0.4% | | 0.4 |
| Ag₂O | 0.11% | 0.080% | 0.0008 to ~0.24* | 0.05 to 0.15% | 0.05 to 0.30% | 0.15 |
| Au₂O | 0.001% | | | | | |
| SnO₂ | 0.003% | 0.003% | | | trace** | |
| As₂O₃ | | | | | 0.1-0.3% | |
| Cu₂O | | | 0.001-1% | | | |
| other oxides | | | | | trace** | |
| Al₂O₃:Li₂O | | | <1.7 | | | |

| Formula | APG #2 | APG #3 | APG #4 | APG #5 | APG #6 | APG #7 | APG #8 | APG #9 | APG #10 | APG #11 | APG #12 | APG #13 | AP #14 |
|---|---|---|---|---|---|---|---|---|---|---|---|---|---|
| Boron Oxide | 1 | 0.75 | 1.25 | 2 | 0.5 | 0.5 | 0.75 | 0.75 | 1 | 0.5 | 0.5 | 0.5 | 0.75 |
| Potassium Oxide | 6 | 5.5 | 6 | 5 | 4 | 5 | 6 | 5.5 | 6.1 | 5 | 4 | 5 | 5 |
| Silica | 71.48 | 71.84 | 69.16 | 72.03 | 73.45 | 70.67 | 71.66 | 71.7 | 71.56 | 72.57 | 72.21 | 72.9 | 72.2 |
| Aluminum Oxide | 6 | 6 | 6 | 6.25 | 5.5 | 6.25 | 6 | 5.8 | 6.2 | 5.25 | 5.5 | 5.5 | 5.5 |
| Sodium Oxide | 2.5 | 2 | 2 | 1 | 2.25 | 2.5 | 2 | 2 | 1.75 | 2.5 | 2.25 | 2.5 | 2.5 |
| Zinc Oxide | 2.5 | 1.5 | 2 | 2 | 1.5 | 1.25 | 2 | 0.5 | 1.8 | 1.25 | 1.45 | 1 | 1 |
| Lithium Oxide | 10 | 11 | 11 | 10.25 | 11.25 | 11.5 | 11 | 11.5 | 10.5 | 11.5 | 11.5 | 11.5 | 11.5 |
| Cerium Oxide | 0.04 | 0.02 | 0.04 | 0.02 | 0.03 | 0.035 | 0.04 | 0.35 | 0.39 | 0.03 | 0.035 | 0.04 | 0.04 |
| Antimonium Trioxide | 0.4 | 0.3 | 0.4 | 0.3 | 0.4 | 0.4 | 0.4 | 0.4 | 0.035 | 0.3 | 0.4 | 0.35 | 0.35 |
| Gold Oxide | 0.08 | 0.04 | | 0.15 | | | | 0.15 | | | | | |
| Silver Oxide | | 0.05 | 0.15 | | 0.12 | 0.14 | | | 0.06 | 0.1 | 0.15 | 0.15 | 0.15 |
| Copper Oxide | | | | | | | | | 0.1 | | | 0.5 | 1 |
| Iron Oxide | | | 1 | 1 | | | | 0.5 | | | | | |
| Calcium Oxide | | 1 | 1 | | | | | 1 | | | | | |
| Barium Oxide | | | | | 1 | 1.75 | | | | 0.5 | 1 | 2 | |

*0.001 to ~0.3 as AgCl
**in some experiments in 5,374,291

This can also be a method to fabricate a shaped glass structure with a high-aspect ratio, comprising: preparing a photosensitive glass substrate having a glass transformation temperature and having a composition of: less than 76 weight % silica, at least 6 weight % K₂O, at least 0.15 weight % Ag₂O, at least 0.75 weight % B₂O₃, and at least 6 weight % Al₂O₃, at least 11 weight % Li₂O, and at least 0.04 weight % CeO₂. Patterning of the selected area(s) by at least one process step selected from the group consisting of: exposing at least one portion of the photosensitive glass substrate to ultraviolet light, while leaving at least a second portion of said glass substrate unexposed; heating the glass substrate to a temperature near the glass transformation temperature to transform at least part of the exposed glass to a crystalline material; etching the glass substrate in an etchant, wherein the etch ratio of exposed portion to said unexposed portion is at least 30:1 when the glass is exposed to a broad spectrum mid-ultraviolet flood lamp, to provide a shaped glass structure with an aspect ratio of at least 30:1, and to provide shaped glass structures with an aspect ratio much greater than 30:1 when the glass is exposed using a high powered energy source, such as a laser.

The present invention can also be used to fabricate a shaped glass structure with a high-aspect ratio, that includes: preparing a photosensitive glass substrate having a glass transformation temperature and having a composition of: less than 76 weight % silica, at least 0.15 weight % Ag₂O, at least 0.75 weight % B₂O₃, at least 11 weight % Li₂O, and at least 0.04 weight % CeO₂ with preferably at least 0.85 weight % B₂O₃ is used. Patterning of the selected area(s) by at least one process step selected from the group consisting of: Exposing at least one portion of the photosensitive glass substrate to ultraviolet light, while leaving at least a second portion of said glass substrate unexposed; heating the glass substrate to a temperature near glass transformation temperature to transform at least part of the exposed glass to a crystalline material; etching the glass substrate in an etchant, wherein the etch ratio of exposed portion to said unexposed portion is at least 30:1 when the glass is exposed to a broad spectrum mid-ultraviolet flood lamp, to provide a shaped glass structure with an aspect ratio of at least 30:1, and to provide shaped glass structures with an aspect ratio much greater than 30:1 when the glass is exposed using a high powered energy source, such as a laser.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method to fabricate a shaped glass structure comprising:
   preparing a photosensitive glass substrate having a glass transformation temperature and having a composition comprising:
   60-76 weight % silica,
   6 weight %-16 weight % of a combination of $K_2O$ and $Na_2O$ with at least 3 weight % $K_2O$,
   0.001-1 weight % $Ag_2O$,
   0.75 weight %-7 weight % $B_2O_3$, and
   5-8 weight % $Al_2O_3$, wherein the combination of $B_2O_3$, and $Al_2O_3$ not exceeding 13 weight %,
   8-15 weight % $Li_2O$, and
   0.04-0.1 weight % $CeO_2$; and
   patterning a structure in a surface of the photosensitive glass substrate;
   exposing at least a first portion of the photosensitive glass substrate to an activating energy source while leaving at least a second portion of said glass substrate unexposed;
   heating the glass substrate to a temperature near the glass transformation temperature to transform at least part of the exposed glass to a crystalline material; and
   etching the glass substrate in an etchant, wherein an etch ratio of exposed portion to said unexposed portion is at least 30:1 to provide a shaped glass structure with an aspect ratio of at least 30:1.

2. The method of claim 1, wherein the glass composition is essentially germanium-free.

3. The method of claim 1, wherein the glass composition comprises at least 1.25 weight % $B_2O_3$.

4. The method of claim 1, wherein the glass composition comprises at least 0.3 weight % $Sb_2O_3$ or $As_2O_3$.

5. The method of claim 1, wherein the glass composition comprises 0.003-1 weight % $Au_2O$.

6. The method of claim 1, wherein the glass composition comprises 1-18 weight % of an oxide selected from the group consisting of CaO, ZnO, PbO, MgO and BaO.

7. The method of claim 1, wherein the glass composition comprises 0-5 weight %, iron ($Fe_2O_3$) to make the composition paramagnetic and/or to use iron (II) and iron (III) to quench intrinsic autofluorescence.

8. The method of claim 1, wherein the glass composition comprises up to 2 weight % Copper Oxide.

9. The method of claim 1, wherein an anisotropic-etch ratio of exposed portion to said unexposed portion is 30-45:1.

10. The method of claim 1, wherein an anisotropic-etch ratio of exposed portion to said unexposed portion is at least one of 10-20:1; 21-29:1; 30-45:1; 20-40:1; 41-45:1; and 30-50:1.

11. The method of claim 1, wherein the etchant comprises hydrofluoric acid.

12. The method of claim 1, wherein the activating energy source comprises an ultraviolet light having a wavelength of about 308-312 nm.

13. The method of claim 1, further comprising depositing a mold material onto the shaped glass structure to provide a negative mold, removing the negative mold from the glass structure, casting a non-glass material into the negative mold, solidifying the non-glass material in the negative mold, and removing the solidified non-glass material from the negative mold to provide a non-glass casting with an anisotropic-etch ratio of at least 30:1.

14. The method of claim 1, wherein the activating energy source comprises a broad spectrum mid-ultraviolet flood lamp.

15. The method of claim 1, wherein the activating energy source comprises a high powered energy source.

* * * * *